United States Patent [19]
Pine

[11] 3,993,557
[45] Nov. 23, 1976

[54] HYDROCARBON CONVERSION PROCESS EMPLOYING BORIA-ALUMINA COMPOSITIONS

[76] Inventor: Lloyd A. Pine, 6226 Morgan Road, Greenwell Springs, La. 70739

[22] Filed: Oct. 9, 1975

[21] Appl. No.: 620,875

Related U.S. Application Data

[62] Division of Ser. No. 455,236, March 27, 1974, Pat. No. 3,954,670.

[52] U.S. Cl. .............................. 208/111; 208/112; 208/114
[51] Int. Cl.$^2$ .......................................... C07C 7/18
[58] Field of Search ................... 208/111, 112, 114

[56] References Cited
UNITED STATES PATENTS

| | | | |
|---|---|---|---|
| 2,980,604 | 4/1961 | Adams et al. ...................... | 208/111 |
| 3,210,264 | 10/1965 | Haney ................................ | 208/79 |
| 3,475,325 | 10/1969 | Doane ................................ | 208/11 |
| 3,642,610 | 2/1972 | Divijak et al. ..................... | 208/58 |

Primary Examiner—Delbert E. Gantz
Assistant Examiner—G. E. Schmitkons
Attorney, Agent, or Firm—Roy J. Ott

[57] ABSTRACT

A catalyst support comprised of boria and alumina is prepared by the hydrolysis of a mixture of boron alkoxide and aluminum alkoxide. The boria-alumina composition prepared in accordance with the invention can be readily formed for use as a support for catalysts useful in a number of hydrocarbon conversion processes. For example, the boria-alumina may be used as a support for various combinations of zeolite, nickel oxide and molybdenum oxide to produce a catalyst particularly useful in the hydrocracking of petroleum feedstocks.

7 Claims, No Drawings

HYDROCARBON CONVERSION PROCESS EMPLOYING BORIA-ALUMINA COMPOSITIONS

This is a division of application Ser. No. 455,236, filed Mar. 27, 1974.

BACKGROUND OF THE INVENTION

1. Field of the Invention

This invention relates to the preparation of catalyst supports and their use in hydrocarbon conversion processes. More particularly, this invention relates to the preparation of boria-alumina catalyst support materials and their use in the hydrocracking of petroleum feedstocks.

2. Description of the Prior Art

Catalyst compositions comprising a major proportion of a support or carrier material such as alumina, silica, silica-alumina, magnesium oxide, clay, etc. and a minor proportion of one or more metal or metal oxides have been used for a variety of hydrocarbon conversion processes. These catalysts are ordinarily prepared by impregnating the support or carrier material with an aqueous solution of a soluble form of a metal catalyst component. The impregnated support material is then dried and calcined to produce a solid supported catalyst comprising a metal catalyst component.

Boria-alumina based catalysts are known to be useful for hydrocarbon conversions. The boria-alumina support material heretofore employed as a catalyst base is known to have been prepared by the hydrolysis of an aluminum alkoxide with an aqueous solution of boric acid or by the impregnation of alumina with a boron compound as shown in U.S. Pat. Nos. 2,713,037 and 3,018,244, respectively. It is found, however, that the boria-alumina based catalyst prepared in accordance with this invention is markedly superior to those boria-alumina based catalysts prepared by conventional methods.

SUMMARY OF THE INVENTION

In accordance with the present invention, an improved catalyst base comprising boria and alumina is prepared by hydrolyzing a mixture of boron alkoxide and aluminum alkoxide. After recovery and calcination of the product, the resulting boria-alumina material may then be incorporated with various known catalyst components to produce a catalyst composition useful in a variety of hydrocarbon conversion processes, particularly with respect to the hydrocracking of petroleum feedstocks.

The aluminum alkoxides used herein may include any alkoxide which contains from 1 to 20, preferably 2 to 4 carbon atoms in the alkoxide group and which is soluble in the liquid reaction medium. Specific examples of suitable aluminum alkoxides include, among others, aluminum sec-butoxide, aluminum ethoxide, aluminum iso-propoxide, aluminum propoxide, aluminum n-butoxide and aluminum iso-butoxide. Mixed aluminum alkoxides such as those produced by oxidizing the growth product from the reaction of aluminum triethyl and ethylene are also suitable.

The boron alkoxides used herein may include any alkoxide which contains from 1 to 20, preferably 1 to 4 carbon atoms in the alkoxide group and which is soluble in the liquid reaction medium. Specific examples of suitable boron alkoxides include, among others, trimethyl borate, triethyl borate, tripropyl borate, and tributyl borate.

The boron alkoxide and aluminum alkoxide are hydrolyzed together in the presence of a suitable solvent and water at a temperature ranging from ambient to the boiling point of the reaction mixture, usually in the range of 20 to 100° C., for a sufficient period of time to complete the desired reaction, usually for a period of 1 to 4 hours. The molar ratio of boron alkoxide to aluminum alkoxide charged to the reaction mixture will be in the range of .030:1.00 to 1.47:1.00. Preferably, the relative amounts of reactants will be adjusted to give a concentration of boria in the boria alumina mixture of at least 5.0 wt. % so that the molar ratio of boron alkoxide to aluminum alkoxide charged to the reaction mixture will preferably be in the range of .077:1.00 to .628:1.00. The amount of water utilized in the reaction mixture is preferably sufficient to substantially complete the co-hydrolysis of the boron and aluminum alkoxides. In general, however, a 5–10% molar excess of water is added to ensure substantially complete hydrolysis of the reaction mixture. The boria-alumina composition prepared in the above manner will generally contain 2 to 50 wt. %, preferably 5 to 30 wt. %, boria.

The reaction mixture is usually conducted in the presence of an organic liquid which is inert to the reactants and acts as a solvent for the system. Suitable solvents include, among others, the $C_1$–$C_4$ alcohols, such as methanol, ethanol, isopropanol, normal butanol, isobutanol, sec-butanol, and t-butanol. The amount of solvent used may range from 0 to 200, preferably 50 to 100 volume part per 100 volume part of combined alkoxide.

After the reaction is complete, the precipitate which has formed is filtered, dried, calcined and combined (either prior or subsequent to calcination) with a minor amount of catalytic materials. Calcination of the boria-alumina product is conveniently effected by heating at 800° to 1200° F. for a period of 1 to 4 hours. Addition of the metals or compounds thereof to the boria-alumina support or carrier material is effected by known techniques such as impregnation and vapor deposition.

The boria-alumina composition prepared in accordance with the invention has a relatively high surface area and is easily formed by conventional extrusion or pelleting operations into a desired shape. Accordingly, the boria-alumina material may be advantageously used as a support or carrier for catalytic materials which function as hydrocarbon conversion catalysts. In general, these metals or compounds of such metals are known to include groups IB, IIA, IIB, IIIB, IVA, IVB, VB, VIB, VIIB and VIII and rare earth Lanthanide Series as given in "Webster's Seventh New Collegiate Dictionary", (1963) published by G. & C. Merriam Company.

The boria-alumina composition of the invention may also be advantageously used as a support or carrier for crystalline aluminosilicates or zeolites effective in promoting hydrocarbon reactions. These crystalline aluminosilicates (zeolites) comprise one or more natural or synthetic zeolites. Representative examples of particularly preferred zeolites are zeolite X, zeolite Y, zeolite L, faujasite and mordenite. Synthetic zeolites have been generally described in U.S. Pat. Nos. 2,882,244, 3,130,007 and 3,216,789, the disclosures of which are incorporated herein by reference.

The silica-alumina mole ratio of useful aluminosilicates is greater than 2.5 and preferably ranges from about 2.5 to 10. Most preferably, this ratio ranges between about 3 and 6. These materials are essentially the dehydrated forms of crystalline hydrous siliceous zeolites containing varying quantities of alkali metal and aluminum with or without other metals. The alkali metal atoms, silicon, aluminum and oxygen in the zeolites are arranged in the form of an aluminosilicate salt in a definite and consistent crystalline structure. The structure contains a large number of small cavities, interconnected by a number of still smaller holes or channels. These cavities and channels are uniform in size. The pore diameter size of the crystalline aluminosilicate can range from 5 to 15A and preferably from 6 to 13A.

The aluminosilicate component may comprise a sieve of one specific pore diameter size or, alternatively, mixtures of sieves of varying pore diameter size. Thus, for example, mixtures of 5A and 13A sieves may be employed as the aluminosilicate component. Synthetic zeolites such as type-Y faujasites are preferred and are prepared by well-known methods such as those described in U.S. Pat. No. 3,130,007.

The crystalline aluminosilicate can be in the hydrogen form, in the polyvalent metal form, or in the mixed hydrogen-polyvalent metal form. The polyvalent metal or hydrogen form of the aluminosilicate component can be prepared by any of the well known methods described in the literature. Representative of such methods is ion-exchange of the alkali metal cations contained in the aluminosilicate with ammonium ions or other easily decomposable cations such as methyl-substituted quaternary ammonium ions. The exchanged aluminosilicate is then heated at elevated temperatures of about 570° to 1112° F. to drive off ammonia, thereby producing the hydrogen form of the material. The crystalline aluminosilicate composition will preferably contain less than about 6.0 wt. % of the alkali metal oxide based on the final aluminosilicate composition and, more preferably, less than 2.0 wt. %.

The resulting hydrogen aluminosilicates can be employed as such, or can be subjected to a steam treatment at elevated temperatures, i.e., 800° to 1300° F., for example, to effect stabilization thereof, against hydrothermal degradation. The steam treatment, in many cases, also appears to effect a desirable alteration in crystal structures resulting in improved selectivity.

Crystalline aluminosilicates which have been exchanged with polyvalent metal cations are particularly useful herein. Suitably, the exchanged polyvalent metals are transition metals and are preferably selected from Group VIII of the Periodic Table. Preferred metals include cobalt, nickel, molybdenum, tungsten, platinum, palladium, and the like. The most preferred metal is nickel. The amount of nickel (or other metal) present in the aluminosilicate (as ion-exchanged metal) can range from about 0.1 to 20% by weight based on the final aluminosilicate composition.

The mixed hydrogen-polyvalent metal forms of the aluminosilicates are also contemplated. In one embodiment the metal form of the aluminosilicate is ion-exchanged with ammonium cations and then partially back-exchanged with solutions of the desired metal salts until the desired degree of exchange is achieved. The remaining ammonium ions are decomposed later to hydrogen ions during thermal activation.

The boria-alumina composition is particularly useful as a catalyst base for use in hydrocracking of petroleum feedstocks. Accordingly, the boria-alumina composition of this invention may advantageously be combined with one or more hydrogenating components comprising the transitional metals, preferably selected from Groups VIB and VIII of the Periodic Table. Examples of suitable hydrogenating metals which may be supported upon the boria-alumina composition include, among others, nickel, tungsten, molybdenum, cobalt, platinum, palladium, including the oxides and sulfides thereof. Mixtures of any two or more of such hydrogenating components may also be employed. The total amount of hydrogenating component supported on the boria-alumina base may range from 0 to 60, usually 10 to 25, wt. % based on the total catalyst composition. For hydrocracking, the zeolites or crystalline aluminosilicates which may be combined with the boria-alumina base will generally be in the hydrogen or ammonium form and/or be exchanged with metal ions such as nickel, cobalt, tin, palladium, platinum and rare earths such as cerium, lanthanum, neodymium, etc.

For use in hydrocracking, the boria-alumina catalyst base of the invention will be contacted with a petroleum feedstock at a temperature in the range of about 400° to 850° F., a pressure of 200 to 2000 psig., a feed rate of 0.1 to 10.0 V/V/Hr. and a hydrogen rate of 500 to 10,000 s.c.f./bbl. of feed.

The boria-alumina composition of the invention may also be used as a carrier or support for metals or compounds thereof useful for desulfurization, denitrogenation, reforming and other hydrocarbon conversion processes. For example, when impregnated with cobalt, nickel, tungsten and/or molybdenum, the boria-alumina composition of the invention is useful for the desulfurization and denitrogenation of both light and heavy petroleum fractions. In addition, the boria-alumina base may be combined with various noble metals such as platinum for use in reforming.

The feedstock suitable for conversion in accordance with the invention includes any of the well-known feeds conventionally employed in hydrocarbon conversion processes. Usually they will be petroleum derived, although other sources such as shale oil are not to be excluded. Typical of such feeds are heavy and light virgin gas oils, heavy and light virgin naphthas, solvent extracted gas oils, coker gas oils, steam-cracked gas oils, middle distillates, steamcracked naphthas, coker naphthas, catalytically-cracked naphthas, cycle oils, deasphalted residua, etc.

DESCRIPTION OF THE PREFERRED EMBODIMENTS

The following examples further illustrate the present invention. Unless otherwise specified, all percentages and parts are by weight.

EXAMPLE 1

This example describes the preparation of a catalyst for hydrocracking to middle distillate products using boria-alumina prepared in accordance with the invention by cohydrolysis of boron and aluminum alkoxides.

A mixture of 67.4 grams trimethyl borate and 637.0 grams aluminum sec-butoxide was hydrolyzed at 180° F. with a solution containing 187 grams water and 1000 ml. isopropyl alcohol. The hydrolysis was carried out by adding the alcohol-water solution to the metal alkoxide mixture with stirring over a 3 hour period. A boria-alumina precipitate was formed which was separated from the alcohol by filtration and dried in a draft oven overnight at about 160° F. A product containing 15 wt. % $B_2O_3$ and 85 wt. % $Al_2O_3$ on a calcined basis was obtained.

The oven dried boria-alumina was dry blended with nickel exchanged Y zeolite which was prepared by exchange with nickel nitrate solution so as to contain 2.98 wt. % nickel on a calcined basis. The proportions of nickel zeolite and boria-alumina were 80 wt. % boria-alumina and 20 wt. % nickel zeolite on a calcined basis. The boria-alumina/zeolite combination was mulled with water and then extruded with a piston extruder. The wet extrudates were dried overnight in a draft oven at about 160° F. and then calcined 2 hours at 1000° F. Molybdenum was then added to the calcined extrudates using ammonium nolybdate in enough water to give incipient wetness. After oven drying at 250° F., additional nickel was added using nickel nitrate in enough water to give incipient wetness. The concentration of reagents was such that the finished catalyst contained 3.0 wt. % nickel oxide and 15.0 wt. % molybdenum trioxide. The catalyst was dried overnight at 250° F. and then calcined 3 hours at 1000° F. It had a surface area of 311 m²/g and a pore volume of .48 cc/g.

EXAMPLE 2

This example describes the preparation of a catalyst comprising boria-alumina prepared by impregnating an alumina with boric acid, which is outside of the scope of the present invention.

The alumina was prepared by hydrolyzing 695 grams of aluminum sec-butoxide at 180° F. with a solution of 167.5 grams of water in 1000 ml. of isopropyl alcohol. The hydrolysis was carried out by adding the alcohol-water solution to the aluminum sec-butoxide with stirring over a 3 hour period. The alumina precipitate was separated from the alcohol by filtration and dried in a draft oven overnight at about 160° F. A warm solution (60° C.) containing 37.3 gms. of boric acid in 275 ml. water was then added to 152.3 grams of the oven dried alumina and the mixture worked to make a uniform paste. The paste was then oven dried overnight at 250° F. These proportions gave a product containing 15 wt. % $B_2O_3$ and 85% $Al_2O_3$ on a calcined basis. The oven dried material was then dry blended with enough of the same nickel zeolite used in Example 1 to give a calcined extrudate containing 20 wt. % nickel zeolite and 80 wt. % boria-alumina.

Extrusion, metals addition, drying, and calcining were then carried out using the same procedures and conditions as in Example 1. The final catalyst contained 3.0 wt. % nickel oxide and 15.0 wt. % molybdenum trioxide. It had a surface area of 342 m²/g. and a pore volume of .64 cc/g.

EXAMPLE 3

This example describes the preparation of a catalyst using boria-alumina prepared by hydrolyzing an aluminum alkoxide with an aqueous solution of boric acid as described in Example 4 of U.S. Pat. No. 2,713,037.

The boria-alumina was prepared by hydrolyzing 637 grams of aluminum sec-butoxide at 180° F. with a solution of 38.8 grams of boric acid and 150.0 grams of water in 1000 ml. of isopropyl alcohol. It was necessary to keep this solution at 140° F. in order to prevent the boric acid from precipitating. The hydrolysis was carried out by adding the water-boric acid-alcohol solution to the aluminum sec-butoxide with stirring over a 3 hour period. The boria-alumina precipitate was separated from the alcohol by filtration and dried overnight in a draft oven at about 160° F. The product, containing 15 wt. % $B_2O_3$ and 85% $Al_2O_3$ on a calcined basis, was then incorporated into a catalyst containing the same amounts of nickel zeolite, nickel oxide, and molybdenum oxide as in Examples 1 and 2. The final catalyst had a surface area of 324 m²/g. and a pore volume of .58 cc/g.

EXAMPLE 4

This example describes the preparation of a catalyst using boria-alumina prepared in still another manner outside the scope of the present invention.

216 grams of alumina monohydrate was ball-milled 16 hours with 50.3 grams of boric acid crystals. The ball-milled mixture was then heated for 4 hours at 302° F. to react the boric acid with the alumina monohydrate. In the same manner as Example 1, the product containing 15 wt. % $B_2O_3$ and 85% $Al_2O_3$ on a calcined basis was then incorporated into a catalyst containing the same amounts of nickel zeolite, nickel oxide and molybdenum oxide as in Example 1. The final catalyst had a surface area of 287 m²/g. and a pore volume of 0.44 cc/g.

EXAMPLE 5

This example describes the preparation of a catalyst using boria-alumina prepared as in Example 1 except that the proportions of reagents is such that the boria-alumina product contains 7.5 wt. % boria and 92.5 wt. % $Al_2O_3$.

In this example, a mixture of 33.7 grams methyl borate and 669 grams of aluminum sec-butoxide was hydrolyzed under the conditions of Example 1 with a solution of 181 grams of water in 1000 ml. of isopropyl alcohol. After filtering and drying the boria-alumina was incorporated in the manner of Example 1 into a catalyst containing the same amounts of nickel zeolite, nickel oxide and molybdenum oxide as in Example 1. The final catalyst had a surface area of 367 m²/g. and a pore volume of .47 cc/g.

EXAMPLE 6

The catalysts prepared as in Examples 1 to 5 were tested as hydrocracking catalysts to produce middle distillate. The feed used was a Kuwait Vacuum Gas Oil with the properties shown in Table I. Process conditions were 2000 psig. pressure, 1.0 volumes of feed per hour per volume of catalyst, and 10,000 SCF/B (standard cubic feet per barrel) of hydrogen. Temperature was adjusted so as to give 50 volume percent conversion to products boiling below 570° F. Selectivity to 300° F.–570° F. product was measured by distillation. Prior to introducing liquid feed to the reactor, the catalysts were sulfided using 10% hydrogen sulfide in hydrogen. The results are summarized in Table II.

TABLE I

| FEED ANALYSES | |
|---|---|
| | Kuwait VGO |
| Sulfur, Wt. % | 3.03 |
| Gravity, ° API | 20.2 |
| Pour Point, ° F. | 105 |
| Nitrogen, ppm | 879.6 |
| Distillation | D-1160 |
| Initial B.P., ° F. | 798 |
| 5% | 825 |
| 10% | 837 |
| 20% | 850 |

TABLE I-continued

| FEED ANALYSES | |
|---|---|
| 30% | 862 |
| 40% | 874 |
| 50% | 886 |
| 60% | 898 |
| 70% | 913 |
| 80% | 937 |
| 90% | 963 |
| 95% | 986 |
| Final B.P., °F. | 1028 |
| Rec., % | 99.0 |
| Res., % | 1.0 |

TABLE II

| Catalyst Example | °F. Required for 50% Conversion | Selectivity to 300–570° F. Product at 50% Conversion, Vol. % |
|---|---|---|
| 1 | 726 | 70 |
| 2 | 722 | 47 |
| 3 | 735 | 44 |
| 4 | 734 | 51 |
| 5 | 733 | 58 |

It can be seen from the results shown above in Table II that of the four catalysts containing 15% $B_2O_3$ in the base, the catalyst of Example 1 is substantially more selective for producing middle distillates. The catalyst of Example 5, containing only 7.5% $B_2O_3$ in the base but prepared in accordance with the invention is also more selective than the prior art catalysts of Examples 2, 3 and 4.

What is claimed is:

1. A hydrocarbon conversion process which comprises contacting a hydrocarbon fluid in a conversion zone at elevated temperatures with a catalyst composition comprising:
   a. a metal or compound of a metal selected from the group consisting of rare earth, Group IB, IIA, IIB, IIIB, IVA, IVB, VB, VIB, VIIB and VIII of the Periodic Table and combinations thereof, and
   b. a boria-alumina composition prepared by hydrolysis of a mixture of aluminum alkoxide and boron alkoxide in the presence of water.

2. The hydrocarbon conversion process of claim 1 wherein said catalyst comprises a crystalline aluminosilicate.

3. A hydrocracking process which comprises contacting a hydrocarbon fluid in a conversion zone at elevated temperatures in the presence of hydrogen with a catalyst composition comprising:
   a. a metal or compound of a metal selected from the group consisting of Group VIB, Group VIII and combinations thereof, and
   b. a boria-alumina composition prepared by hydrolysis of a mixture of aluminum alkoxide and boron alkoxide in the presence of water.

4. The hydrocracking process of claim 3 wherein said metal is selected from the group consisting of cobalt, nickel, molybdenum, tungsten, platinum, palladium and combinations thereof.

5. The hydrocracking process of claim 4 wherein said catalyst comprises a crystalline aluminosilicate.

6. The hydrocracking process of claim 5 wherein said boria-alumina composition contains 5 to 30 wt. % boria.

7. The hydrocracking process of claim 6 wherein said crystalline aluminosilicate comprises a polyvalent metal selected from rare earth, Group VIII and combinations thereof.

* * * * *